United States Patent [19]
Aiba et al.

[11] Patent Number: 5,537,214
[45] Date of Patent: Jul. 16, 1996

[54] READING AND WRITING APPARATUS WITH ROTATING MIRROR

[75] Inventors: Masahiko Aiba, Nara; Toshio Urakawa, Yamatokoriyama, both of Japan

[73] Assignee: Sharp Kabushiki Kaisha, Nagaike-cho, Japan

[21] Appl. No.: 299,830

[22] Filed: Sep. 1, 1994

[30] Foreign Application Priority Data

Sep. 2, 1993 [JP] Japan .................................. 5-218819

[51] Int. Cl.$^6$ ............................ H04N 1/024; H04N 1/29; G01D 15/14; G01D 9/42
[52] U.S. Cl. ................... 358/296; 358/300; 358/472; 347/134; 347/256; 347/260
[58] Field of Search ................................. 358/296, 300, 358/471, 472, 474, 475, 481; 347/134, 225, 231, 233, 241, 243, 256, 261

[56] References Cited

U.S. PATENT DOCUMENTS

| | | | |
|---|---|---|---|
| 4,002,829 | 1/1977 | Huchison | 358/481 |
| 4,386,374 | 5/1983 | Toshiba | 358/302 |
| 4,488,042 | 12/1984 | Clay et al. | 359/19 |
| 4,573,084 | 2/1986 | Toshiba | 358/300 |
| 5,327,263 | 7/1994 | Katagiri et al. | 358/471 |

FOREIGN PATENT DOCUMENTS

| | | |
|---|---|---|
| 0410490A2 | 1/1991 | European Pat. Off. . |
| 55-069168A | 5/1980 | Japan . |
| 62-242910A | 10/1987 | Japan . |

OTHER PUBLICATIONS

Patent Abstracts of Japan, vol. 4, No. 115 (P-023), 24 May 1980, abstracting Hayakawa/Ricoh JP 55-069 168-A.

Patent Abstracts of Japan, vol. 12, No. 114 (P-688), 23 Oct. 1987, abstracting Komata/Photo Composing Mach. Mfg. Co. Ltd. JP 62-242 910-A.

*Primary Examiner*—Peter S. Wong
*Assistant Examiner*—Eric Frahn
*Attorney, Agent, or Firm*—David G. Conlin; Milton Oliver

[57] ABSTRACT

A laser beam printer includes a movable mirror which is rotated by a scan mirror motor. Laser light is alternately deflected toward an information reading station and an information writing station by applying the laser light to the movable mirror from a semiconductor laser. The laser light is switched between writing-use light and reading-use light at the time the movable mirror is rotated through a predetermined angle. In the laser beam printer having the semiconductor laser which is used for both writing and reading information, information is written and read out during one rotation of the movable mirror. It is therefore possible to perform a reading operation and a writing operation simultaneously by simply switching the laser light at the predetermined time depending on the rotation angle of the movable mirror.

16 Claims, 8 Drawing Sheets

READING AND WRITING APPARATUS WITH ROTATING MIRROR

FIELD OF THE INVENTION

The present invention relates to an optical scanning apparatus such as a laser beam printer and a laser fax machine using, for example, an electrophotographic system.

BACKGROUND OF THE INVENTION

In an optical scanning apparatus such as a laser beam printer having a document reading function, writing and reading of information are usually performed using a single laser light source. For example, the following two methods have been proposed. One is a method for changing the optical path of laser light by changing the angle of a reflecting mirror positioned on the optical path (see U.S. Pat. No. 4,573,084). The other is a method for dividing light into reading-use light and writing-use light by positioning a half mirror on the optical path (see U.S. Pat. No. 4,386,374).

First, with the method for changing the angle of the reflecting mirror, as illustrated in FIG. 8, laser light is first deflected when reflected by a rotating polygon mirror 61. The deflected laser light goes through an fθ correction lens 62 and reaches a movable reflecting mirror 63. When the reflecting mirror 63 is in a position indicated by the solid line of FIG. 8, the laser light which has been modulated according to a predetermined data signal is guided to a surface of a photoreceptor 64 for writing information. On the other hand, when the reflecting mirror 63 is in a position indicated by the alternate long and two short dashes line of FIG. 8, the laser light illuminates a surface of a document 65. Information is read out when reflected light from the document 65 is received by a light receiving element 66.

With the method in which a half mirror is positioned on the optical path, as illustrated in FIG. 9, the laser light is deflected by the rotating polygon mirror 61, goes through the fθ correction lens 62 like in the above-mentioned method, and reaches a half mirror 67. The half mirror 67 divides the laser light into light which goes through the half mirror 67 and light which is reflected by the half mirror 67. The laser light reflected by the half mirror 67 illuminates the surface of the document 65. When reflected light from the document 65 is received by the light receiving element 66, information is read out. When reading information, a douser 68 is disposed between the photoreceptor 64 and the half mirror 67 so as to stop the laser light which has passed through the half mirror 67 from illuminating the photoreceptor 64. On the other hand, when writing information on the photoreceptor 64 using the laser light which has passed through the half mirror 67, the douser 68 is positioned outside the optical path of the laser light so that the laser light which has been modulated according to a predetermined data signal illuminates the photoreceptor 64.

However, with the optical scanning apparatuses employing the above-mentioned methods, although it is possible to write and read information with a single laser light source, it is impossible to simultaneously read information while writing information.

More specifically, with the method in which the angle of the reflecting mirror is changed, the laser light emitted by the laser light source illuminates the photoreceptor when writing information, and illuminates the document when reading information. Namely, the laser light illuminates either the photoreceptor or the document depending on the angle of the reflecting mirror.

Meanwhile, with the method in which the half mirror is positioned on the optical path, it is possible to illuminate both the photoreceptor and the document with the laser light. However, since the laser light used for writing information has been modulated according to the data signal, it can not be used for reading information. Additionally, since the laser light used for reading information is continuously emitted, it can not be used for writing information.

In short, the reading operation can not be performed simultaneously with the writing operation. Consequently, the reading and writing operations are executed in real time, and the processing efficiency is lowered.

SUMMARY OF THE INVENTION

It is an object of the present invention to provide an optical scanning apparatus capable of writing and reading information with a single laser light source and of performing a reading operation during a writing operation.

In order to achieve the above object, an optical scanning apparatus of the present invention includes: a laser light source for emitting laser light; information reading means for reading information from a document using the laser light; information writing means for recording the information using the laser light; light deflecting means for deflecting the laser light from the laser light source by rotation so as to guide the laser light to the information reading means and the information writing means alternately; and controlling means for controlling the laser light source according to a rotation angle of the light deflecting means so that the laser light source emits continuous light when the laser light reaches the information reading means through the light deflecting means and that the laser light source emits modulated light corresponding to the information when the laser light reaches the information writing means through the light deflecting means.

With this structure, the direction in which the laser light from the laser light source is reflected by the light deflecting means varies as the light deflecting means rotates, and the laser light is deflected to the information reading means and the information writing means alternately as the light deflecting means rotates. The laser light source is controlled by the controlling means depending on the rotation angle of the light deflecting means so that modulated light modulated according to information to be written is emitted when the laser light reaches the information writing means through the light deflecting means and that continuous light is emitted when the laser light reaches the information reading means through the light deflecting means.

As described above, by switching the laser light emitted by a single laser light source between continuous light and modulated light depending on the rotation angle of the light deflecting means and by applying the laser light to the information reading means and the information writing means alternately, reading and writing of information are simultaneously performed.

Denoting that points at which a perpendicular line from the light deflecting means crosses a surface of the information reading means to which the laser light is applied and a perpendicular line from the light deflecting means crosses a surface of the information writing means on which the laser light is applied as optical axis points, if the light deflecting means is rotated at a constant angular speed, a speed at which a spot of the laser light formed on the surfaces is moved, i.e., a scanning speed of the laser light is not uniform. The scanning speed becomes faster as the spot is moved away from the optical axis point, resulting in a distorted image.

Then, if reflecting means for reflecting the laser light reflected by the light deflecting means once or a plurality of times and guiding the light to the information reading means and the information writing means is added to the structure of the optical scanning apparatus, the lengths of the optical paths formed between the light deflecting means and the information reading means and between the light deflecting means and the information writing means become longer. It is thus possible to control the difference in the scanning speed between the optical axis point and points located away from the optical axis point to be within a tolerance. With this structure, it is not necessary to use expensive fθ lenses to correct the scanning speed of the laser light. Consequently, reading and writing operations are performed simultaneously, and the cost of manufacturing the apparatus is reduced.

Moreover, with the structure where the fθ correcting means for fθ-correction is disposed on the optical path formed between the light deflecting means and the information reading means and on the optical path formed between the light deflecting means and the information writing means instead of the reflecting means, the scanning speed of the laser light is corrected by the fθ correcting means, and the distance between the light deflecting means and the information reading means and the distance between the light deflecting means and the information writing means become shorter. As a result, reading and writing operations are performed simultaneously, and a more compact apparatus is achieved.

Furthermore, with the structure where a clock correcting circuit for varying a timing clock which determines speeds of writing and reading information is provided instead of the fθ correcting means, the clock correcting circuit varies the timing clock based on the ratio of a scanning speed at a location presently scanned by the laser light to the scanning speed at the optical axis point. Thus, the scanning speed of the laser light is corrected without using expensive fθ lenses, and the distance between the light deflecting means and the information reading means and the distance between the light deflecting means and the information writing means become shorter. As a result, reading and writing operations are performed simultaneously, the cost of manufacturing the apparatus is reduced, and a more compact apparatus is achieved.

Additionally, with the above-mentioned structures, the information writing means and the information reading means are symmetrically located about the light deflecting means, and the laser light source is positioned so that a line connecting the information reading means to the information writing means and a line connecting the light deflecting means to the laser light source cross substantially at a right angle. With this arrangement, angles through which the laser light is applied to the information writing means and the information reading means from the light deflecting means are made equal and larger.

If the laser light source is positioned other than the above-mentioned location, an angle between the incident direction of the laser light and a reflecting surface of the light deflecting means becomes larger compared with the above-mentioned case when the laser light is reflected toward the information writing means or the information reading means, thereby resulting in a larger reflecting surface. It is therefore effective to position the laser light source in the above-mentioned location in order to restrain increases in the manufacturing cost and torque for driving the light deflecting means.

When the light deflecting means has one reflecting surface or two reflecting surfaces, if the information writing means and the information reading means are positioned symmetrically about the light deflecting means and if, for example, the scanning angle of the laser light required for reading and writing information is $\pm\alpha°$, an area needs to be scanned is given by an angle $(180\pm2\alpha)°$. Namely, a desirable angle to be scanned by light reflected from one surface is larger than 180°.

Denoting the number of surfaces of the light deflecting means as N, an angle which can be scanned by light from one surface is calculated by $(360°\times2)/N$. Thus, when N is one or two, the laser light can scan through 360°. On the other hand, if N is three and four, the laser light can scan through 240° and 180°, respectively. It is possible to use light deflecting means having three reflecting surfaces in the optical scanning apparatus of the present invention because an scanning angle larger than 180° is obtained when N is three. However, the freedom of design is reduced as $\alpha°$ is not larger than 30°. It is therefore desirable to use light deflecting means having one or two reflecting surface(s).

When a flat mirror plate having a reflecting surface on both sides is used as the light deflecting means, if the mirror thickness d is arranged such that $$d<[L\cdot\sin(45°-\alpha°/2)-D]/\sin(45°-\alpha°/2)\cdot\tan(45°+\alpha°/2)$$

where D is the diameter of the incident beam, L is the length of the flat mirror and $\pm\alpha°$ is the scanning angle, the laser light falls upon the reflecting surfaces and edge portions of the reflecting surfaces are effectively used.

For a fuller understanding of the nature and advantages of the invention, reference should be made to the ensuing detailed description taken in conjunction with the accompanying drawings.

DESCRIPTION OF THE PREFERRED EMBODIMENTS

[Embodiment 1]

The following description discusses one embodiment of the present invention with reference to FIGS. 1 to 6.

Figure 2:
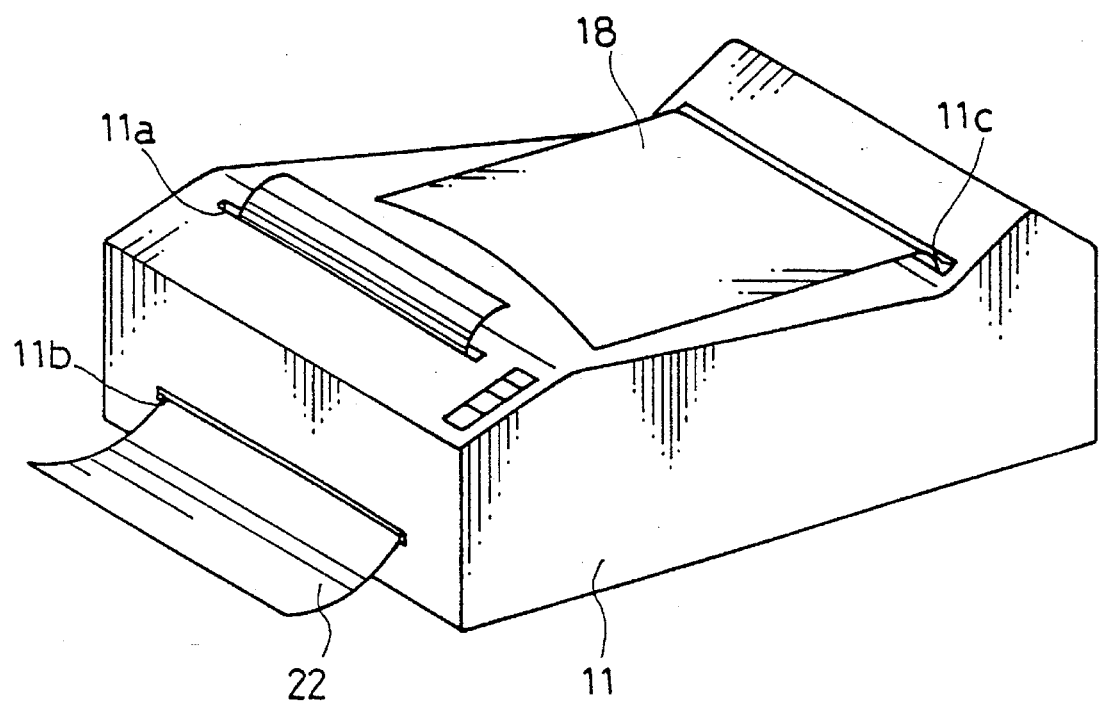
FIG. 2 is a perspective view showing the appearance of the laser beam printer.

A laser beam printer (optical scanning apparatus) of this embodiment has a document reading function. As illustrated in FIG. 2, the laser beam printer includes a document inserting slit 11a from which a document 22 carrying thereon an image to be read is inserted, and a document discharging slit 11b from which the document 22 is discharged after the image is read. The document inserting slit 11a is formed at the top of a main body 11, and the document discharging slit 11b is formed on a side thereof. Formed also at the top of the main body 11a is a recording-sheet discharging slit 11c from which a recording sheet 18 on which the read image is recorded is output.

Figure 1:
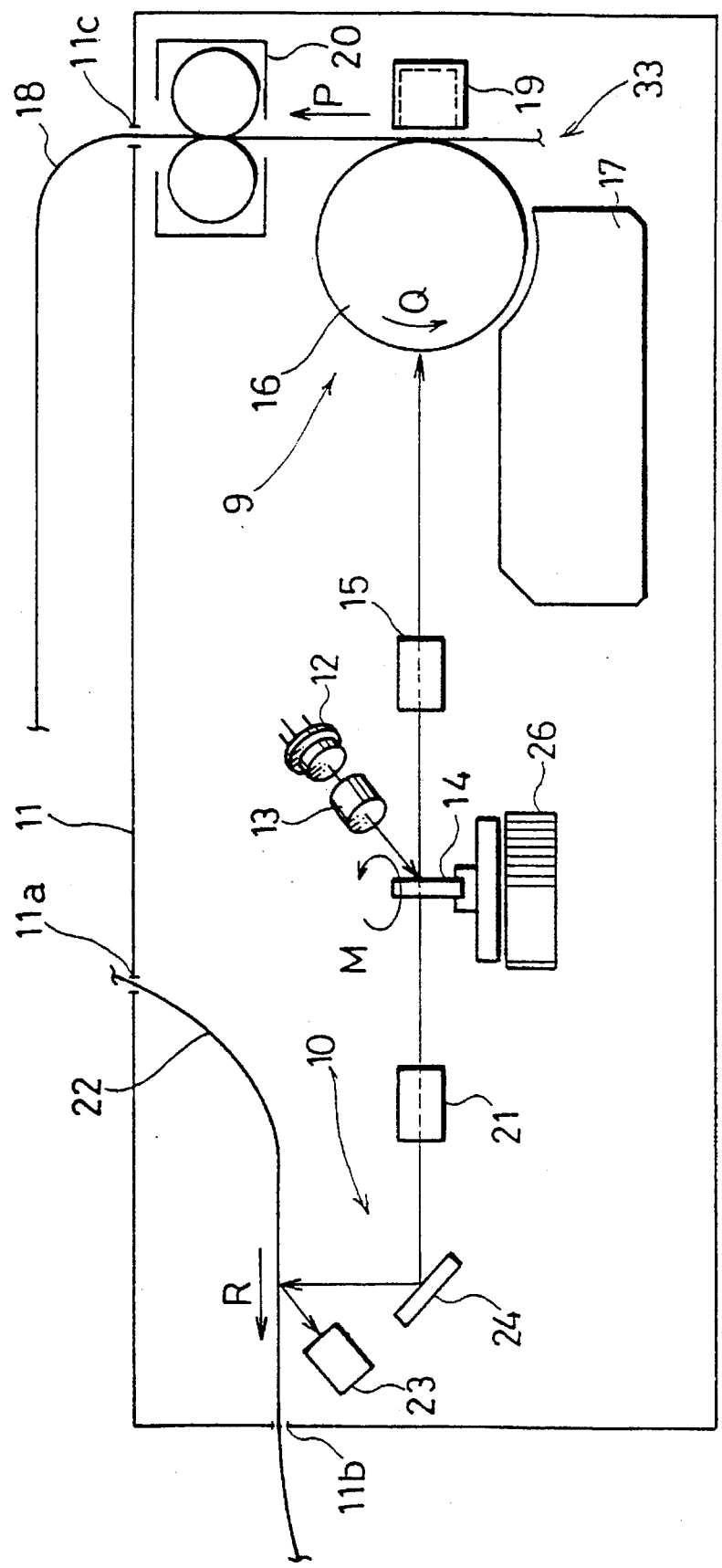
FIG. 1 is a depiction showing a schematic structure of a laser beam printer according to one embodiment of the present invention.

As illustrated in FIG. 1, disposed substantially at the center of the main body 11 are a semiconductor laser (laser light source) 12 for emitting laser light, a converging lens 13, a movable mirror (light deflecting means) 14, a scan mirror motor 26, a recording-use correction lens (fθ correcting means) 15, a reading-use correction lens (fθ correcting means) 21, an information reading station (information reading means) 10, and an information writing station (information writing means) 9. The converging lens 13 converges the laser light from the semiconductor laser 12. When the laser light converged by the converging lens 13 falls upon the movable mirror 14, the movable mirror 14 is rotated at a constant speed to deflect the laser light. The scan mirror motor 26 rotates the movable mirror 14 at a constant speed in the direction of arrow M. The recording-use correction lens 15 and reading-use correction lens 21 are disposed on both sides of the movable mirror 14. The laser light deflected by the movable mirror 14 falls upon the correction lenses 15 and 21. The laser light which has passed through the reading-use correction lens 21 illuminates the information reading station 10, while the laser light which has passed through the writing-use correction lens 15 illuminates the information writing station 9.

A direction toward which the laser light is reflected by the movable mirror 14 is detected by a laser position detecting element 38a, to be described later. The structure of the movable mirror 14, and the relation between the rotation angle of the movable mirror 14 and the laser illumination direction will be described later in detail.

The information reading station 10 includes a mirror 24 and a reading element 23. The mirror 24 reflects the laser light which has passed through the reading-use correction lens 21 toward the document 22 which is moving in the direction of arrow R. The reading element 23 has a single light receiving surface, and receives light which has been reflected by the mirror 24 and the document 22.

The information writing station 9 includes a photoreceptor 16 which rotates in the direction of arrow Q, a developer container 17, and a transfer device 19. The laser light which has passed through the writing-use correction lens 15 is applied to the photoreceptor 16. The developer container 17 and the transfer device 19 are disposed around the photoreceptor 16. The developer container 17 develops a latent image formed on the surface of the photoreceptor 16 with the application of the laser light into a visible toner image by causing toner to adhere to the latent image. The transfer device 19 transfers the visible toner image formed on the surface of the photoreceptor 16 to a recording sheet 18 fed in the direction of arrow P by a sheet feeding mechanism 32, to be described later.

Disposed also around the photoreceptor 16 is a charger, not shown, for charging the surface of the photoreceptor 16 to a predetermined potential. Moreover, positioned above the transfer device 19 is a fusing device 20 for fixing the visible toner image onto the recording sheet 18 by heat and pressure. The photoreceptor 16, the developer container 17, the transfer device 19, the fusing device 20, and the charger, not shown, constitute an electrophotographic processing section (electrophotographic processing means) 33 of the laser beam printer.

Figure 3:
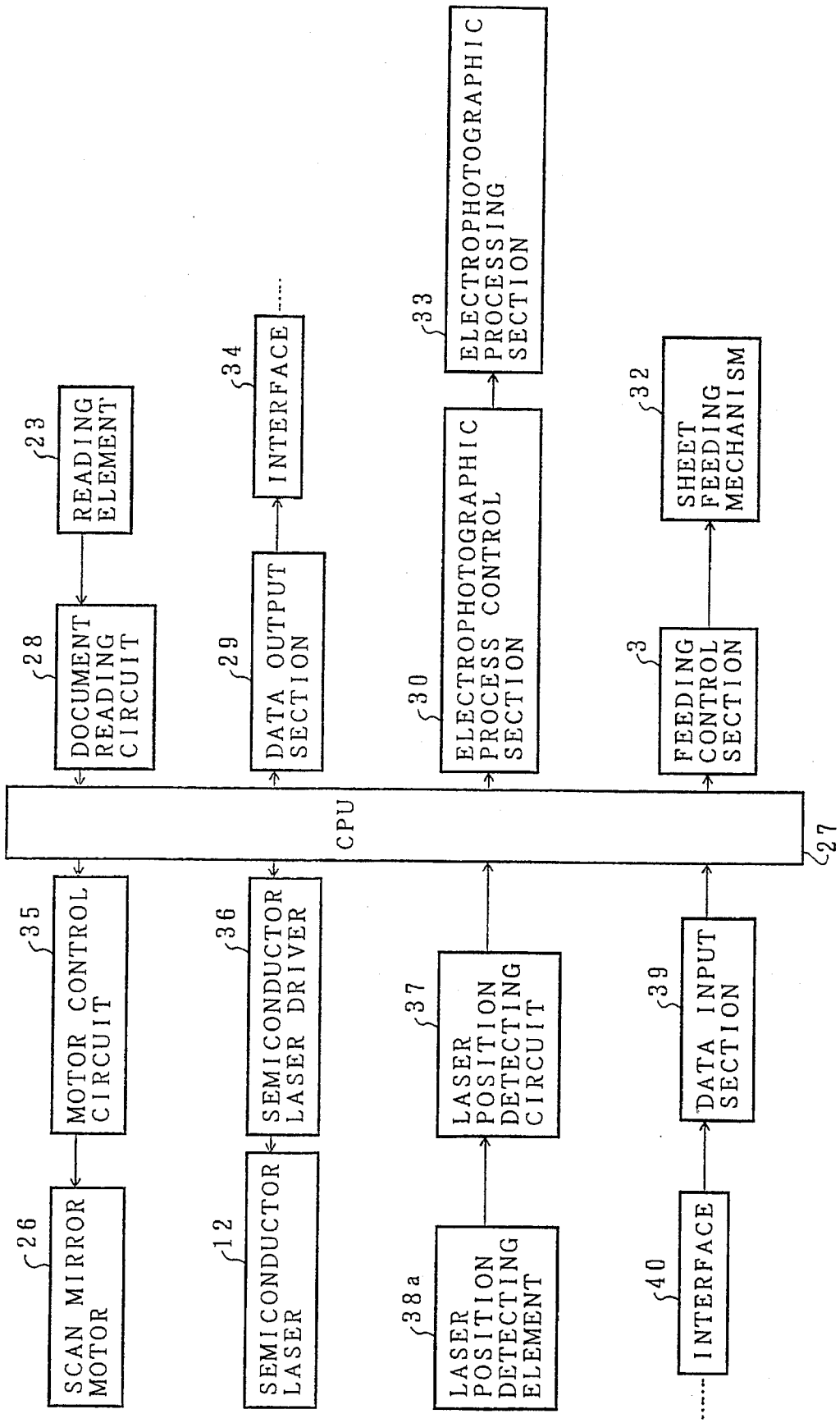
FIG. 3 is a block diagram showing the structure of a control system in the laser beam printer.

As illustrated in FIG. 3, the laser beam printer includes a CPU (controlling means) 27 for controlling the above-mentioned members according to a predetermined program.

The CPU 27 is connected to the document reading circuit 28, the laser position detecting circuit 37, and the data input section 39. A signal read out from the document 22 by the reading element 23 is input to the document reading circuit 28. An incident signal from the laser position detecting element 38a is input to the laser position detecting circuit 37. A signal which is output, for example, when an input key (not shown) of the laser beam printer is pressed is input to the data input section 39 through an interface 40.

The CPU 27 is also connected to a motor control circuit 35, a semiconductor laser driver (light source driving means) 36, a data output section 29, an electrophotographic process control section 30, and a feeding control section 3. The scan mirror motor 26 is driven under the control of the motor control circuit 35. The semiconductor laser driver 36 controls, for example, a drive voltage of the semiconductor laser 12. The data output section 29 outputs through an interface 34 various messages to be displayed on a display section, not shown. The electrophotographic processing section 33 is driven under the control of the electrophotographic process control section 30. The feeding control section 3 controls the recording sheet 18 to be timely supplied to the photoreceptor 16 by controlling the driving of the sheet feeding mechanism 32.

Namely, the CPU 27 transmits output signals to the motor control circuit 35, the semiconductor laser driver 36, the data output section 29, the electrophotographic process control section 30, and feeding control section 3 according to input signals from, for example, the laser position detecting circuit 37, the data input section 39 and the document reading circuit 28, and controls the scan mirror motor 26, the semiconductor laser 12, the electrophotographic processing section 33, and the sheet feeding mechanism 32.

Figure 4:
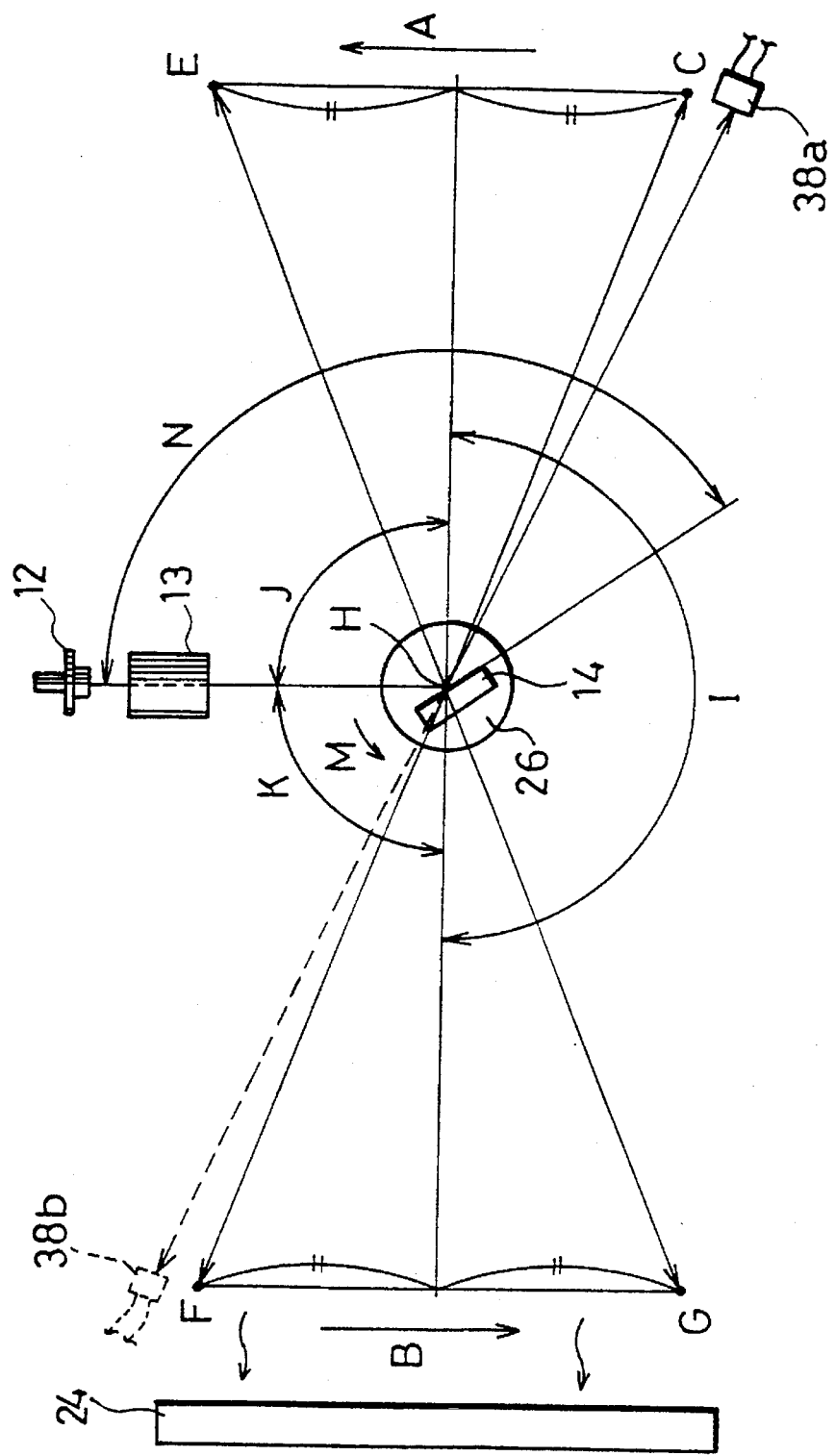
FIG. 4 is a depiction explaining the relation between the rotation angle of a movable mirror and the deflecting direction of laser light in the laser beam printer.
Figure 5:
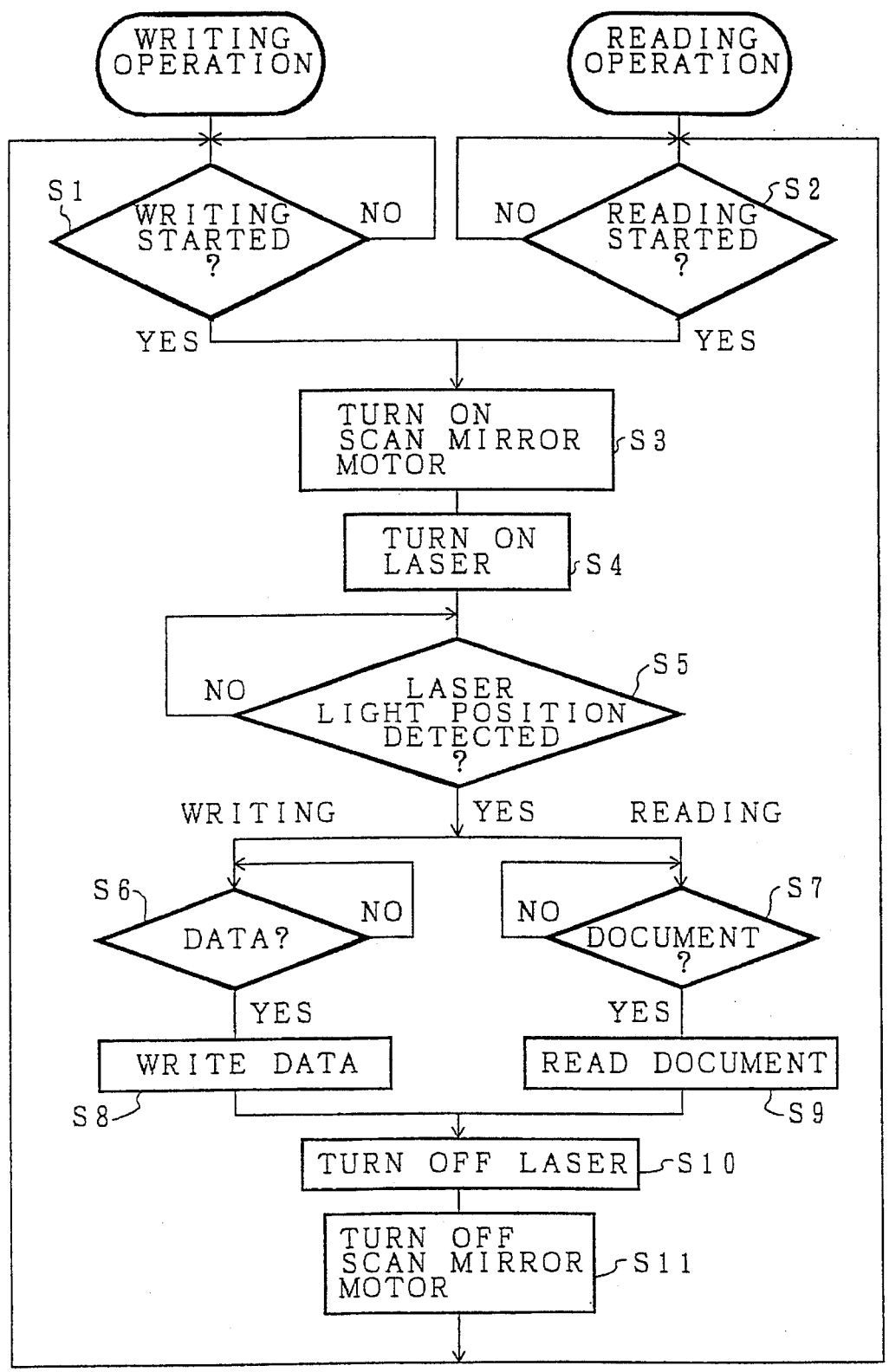
FIG. 5 is a flowchart explaining the steps of writing and reading operations in the laser beam printer.

Referring now to FIG. 4, the movable mirror 14 is explained below.

The movable mirror 14 is a single-sided mirror formed by forming a reflective film on a surface of flat glass, and rotates about an axis on the mirror surface. Therefore, if the scanning center H of the laser light is arranged to come to a predetermined point on the mirror surface (near the center of the mirror surface in this embodiment), it is possible to scan the reflected light through 360° by a rotation of the movable mirror 14, resulting in improved scanning accuracy. Namely, as the movable mirror 14 onto which the laser light is applied from the semiconductor laser 12 is rotated in the direction of arrow M as shown in FIG. 4, the reflecting direction of the laser light is varied.

In FIG. 4, information is written when the reflected light from the movable mirror 14 falls upon a writing start position C, moves in the direction of arrow A, and reaches a writing end position E. When reading information, the movable mirror 14 is further rotated. The information is read out, when the reflected light from the movable mirror 14 falls upon a reading start position F, moves in the direction of arrow B, and reaches a reading end position G. Namely, information is written once and read out once during a rotation of the movable mirror 14. It is therefore possible to write and read information simultaneously by repeatedly rotating the movable mirror 14. The CPU 27 controls the semiconductor laser driver 36 so that the laser light emitted by the semiconductor laser 12 is flashing according to writing data corresponding to a readout signal from the reading element 23 when the reflected light illuminates the writing start position C to the writing end position E. On the other hand, the CPU 27 controls the semiconductor laser driver 36 so that the laser light emitted by the semiconductor laser 12 becomes continuous light having a predetermined intensity when the reflected light illuminates the reading start position F to the reading end position G. The emitted continuous laser light is reflected by the mirror 24 and falls upon the document 22.

The laser position detecting element 38a is disposed in a position so that the reflected light from the movable mirror 14 falls thereon immediately before it strikes the writing start position C. The laser position detecting element 38a transmits an incident signal when the reflected light falls thereon. The CPU 27 to which the incident light from the position detecting element 38a is input calculates the moments at which the reflected light passes through the writing start position C and the writing end position E, respectively, based on the incident signal, and controls the start and end of laser light modulation of the semiconductor laser 12. The CPU 27 also calculates the moments at which the reflected light passes through the reading start position F and the reading end position G based on the incident signal, and controls the semiconductor laser driver 36 to emit continuous light for reading data during the time between the calculated moments.

In order to improve the accuracy of calculating the moments for starting and ending the reading of data, a position detecting element 38b for detecting the timing of reading may be disposed in the vicinity of the reading start position F so that the CPU 27 calculates the moments at which the reflected light passes through the reading start position F and the reading end position G based on the incident signal.

In the laser beam printer having the above-mentioned structure, when performing a writing operation, the laser light emitted by the semiconductor laser 12 shown in FIG. 1 goes through the converging lens 13 and falls upon the movable mirror 14. Then, when the movable mirror 14 which is driven at a constant speed by the scan mirror motor 26 is rotated through a predetermined rotation angle, the laser light falls upon and passes through the writing-use correction lens 15, and reaches the surface of the photoreceptor 16. When the laser light falls upon the writing-use correction lens 15, it is modulated according to the writing data under the control of the CPU 27 based on the incident signal from the laser position detecting element 38a. The laser light scans the surface of the photoreceptor 16 at a constant speed because of the optical path correction (fθ correction) performed by the writing-use correction lens 15.

When the modulated laser light strikes the photoreceptor 16, a latent image is formed on the surface of the photoreceptor 16 which has been charged to a predetermined potential. As the photoreceptor 16 rotates, the surface on which the latent image is formed passes through the developer container 17 in which toner adheres to the latent image, thereby forming a visible toner image. When the recording sheet 18 transported by the sheet feeding mechanism 32 passes through between the transfer device 19 and the photoreceptor 16, the visible toner image is transferred to the recording sheet 18.

The recording sheet 18 is heated and pressed while it is passing through the fixing device 20 to fix the visible toner image onto the recording sheet 18, and discharged from the output section 11c in the main body 11. Print processing for forming the image on the recording sheet 18 is carried out through such a series of operations.

On the other hand, when the movable mirror 14 is further rotated in the M direction by the scan mirror motor 26, the direction in which the laser light is deflected varies, and the laser light applied from the semiconductor laser 12 to the movable mirror 14 through the converging lens 13 falls upon the reading-use correction lens 21. The laser light which has passed through the reading-use correction lens 21 strikes the surface of the document 22 through the mirror 23, reflected by the surface of the document 22, and falls upon the reading element 23.

The reading element 23 reads the image data from the intensity of the reflected light corresponding to the surface state of the document 22. At this time, the CPU 27 controls continuous laser light to be applied to the reading-use correction lens 21 according to the incident signal from the laser position detecting element 38a. The speed of scanning the laser light on the surface of the document 22 during reading is made uniform by the optical path correction (fθ correction) performed by the reading-use correction lens 21.

As described above, since the laser beam printer is provided with recording and reading use correction lenses for scanning (fθ-correcting) the laser light at a constant speed, the distance between the scanning center H on the movable mirror 14 and the information reading station 10 or the information writing station 9 becomes shorter. This structure reduces the space occupied by these members, and achieves a more compact main body of the apparatus.

When the power of the laser light required for reading information and for writing information vary, laser power suitable for reading information and laser power suitable for writing information are obtained by ND-coating one of or both the surfaces of the correction lenses 15 and 21 to attenuate light. It is also possible to adjust the laser power, for example, by disposing a filter on the optical path.

As described above, with the laser beam printer, writing and reading of the information are performed during one rotation of the movable mirror 14. Next, referring to the flowchart of FIG. 5, the following description explains control operations of the CPU 27.

When writing information, a signal which instructs to start writing is input (step 1), the scan mirror motor 26 is turned ON (step 3), the movable mirror 14 is rotated, and the semiconductor laser 12 is turned ON (step 4). Then, the position detecting element 38a outputs an incident signal to judge whether a position whereupon the laser light falls is detected or not (step 5). If the existence of writing data is detected (step 6), the application of the laser light, which has been modulated according to the writing data, to the surface of the photoreceptor 16 is started at the predetermined time so as to write data (step 8). When writing of the data is complete, the semiconductor laser 12 is turned OFF (step 10), and the scan mirror motor 26 is turned OFF (step 11).

When reading information, a signal which instructs to start reading is input (step 2), the scan mirror motor 26 and the semiconductor laser 12 are turned ON (steps 3 and 4). In this state, when the position of the laser light is detected (step 5) and if the existence of the document 22 is detected in step 7, the application of the continuous laser light to the document 22 is started at the predetermined time so as to read the document 22. When the reading is complete, the semiconductor laser 12 and the scan mirror motor 26 are turned OFF (steps 10 and 11).

When alternately performing the writing operation and the reading operation, it is necessary to continuously rotate the movable mirror 14 at a uniform speed by the scan mirror motor 26.

When repeatedly performing the writing operation and the reading operation by turns, as described above, the timing of switching the laser light emitted by the semiconductor laser between modulated light and continuous light is detected from the time when the laser position detecting element 38a shown in FIG. 4 detects the application of the laser light from the movable mirror 14 and outputs the incident signal. More specifically, the intervals between the transmission of the incident light and the application of the laser light to the writing start position C, the writing end position E, the reading start position F, and the reading end position G are respectively calculated from the rotation speed of the movable mirror 14. Thus, the CPU 27 writes information by flashing the laser light according to the writing data when the laser light passes the writing start position C, moves in the A direction and reaches the writing end position E.

On the other hand, the CPU 27 reads the reading data corresponding to the image on the document 22 using the reading element 23 by continuously emitting the laser light when the laser light passes through the reading start position F, moves toward the B direction and reaches the reading end position G by a rotation of the movable mirror 14. When the laser light falls upon the position detecting element 38a again due to the rotation of the movable mirror 14, the laser light is again switched in a timely manner similar to the above.

As described above, with the laser beam printer of this embodiment, writing and reading operations are performed during one rotation of the movable mirror 14, and the laser light emitted by the semiconductor laser 12 is used for writing and reading information under the control according to the rotation angle of the movable mirror 14. It is thus possible to read information while writing information by rotating the movable mirror 14 at a uniform speed without requiring any switching operations.

Regarding conditions for the relative positions of the incident direction of laser light and the readout area F-G and the writing area C-E, considering the document feed direction, recording-sheet feed direction and scanning angle of the movable mirror 14, as illustrated in FIG. 4, it is desirable to arrange an angle I to be substantially 180°. The angle I is an angle between a line connecting the center of the writing area C-E to the scanning center H and a line connecting the center of the readout area F-G to the scanning center H. More specifically, like a copying machine and a fax machine, in a laser beam printer, the document feed direction and the recording-sheet feed direction are usually arranged to the same, opposite, or orthogonal to each other on a plan view. However, in the laser beam printer of this embodiment, since the information is read out and written by using a single semiconductor laser and rotating the movable mirror 14, it is impossible to arrange the writing area and the readout area on the same side when seen from the movable mirror 14.

Furthermore, in order to maximize the writing area C-E and the readout area F-G, it is desirable to arrange the writing area and the readout area in the opposite sides about the movable mirror 14. Namely, it is desirable to symmetrically arrange the readout area F-G and the writing area C-E about the movable mirror 14.

An angle J between the line connecting the center of the writing area C-E to the scanning center H and the incident direction of the laser light, and an angle K between the line connecting the center of the readout area F-G to the scanning center H and the incident direction of the laser light are desired to be substantially right angles. If the laser light is applied through an angle other than 90°, an angle (indicated by N in FIG. 4) between the mirror surface of the movable mirror 14 and the incident direction of the laser light when reading or writing information becomes larger compared with an angle formed when the laser light is applied through 90°. This causes increases in the size of the movable mirror 14, the manufacturing costs, and the torque for driving the movable mirror 14.

In this embodiment, a singe-sided mirror is used as the movable mirror 14 for deflecting the laser light. However, it is also possible to use a double-sided mirror having a reflective film on both sides of flat glass. In this case, the reading operation and the writing operation are alternately performed twice respectively during a single rotation of the mirror. It is not necessarily to use glass for the mirror. For example, a resin molded article having a reflective film thereon may be used as the mirror.

As described above, when the readout area and the writing area are symmetrically located about the scanning center H, an area needs to be scanned by light from a surface of the mirror is given by an angle $(180+2\alpha)°$ where a scanning angle required for reading and writing is $\pm\alpha°$. Namely, an angle larger than 180° needs to be scanned by light from a surface of the mirror.

Denoting the number of surfaces of the movable mirror 14 as N, an angle which can be scanned by light from a surface of the mirror 14 is calculated by 360°×2/N. Thus, when the number of mirror surfaces is one or two, the laser light can scan through 360°. On the other hand, if the number of mirror surfaces becomes three and four, the laser light can scan through 240° and 180°, respectively. It is therefore impossible to use a movable mirror having more than three mirror surfaces in the laser beam printer. In other words, it is possible to use a movable mirror having three mirror surfaces in the laser beam printer. In this case, however, $\alpha°$ is limited to a value not larger than 30°, and freedom of design is also limited. With such a reason, if a single-sided mirror or a double-sided mirror as the movable mirror 14, the freedom of design is increased.

Figure 6:
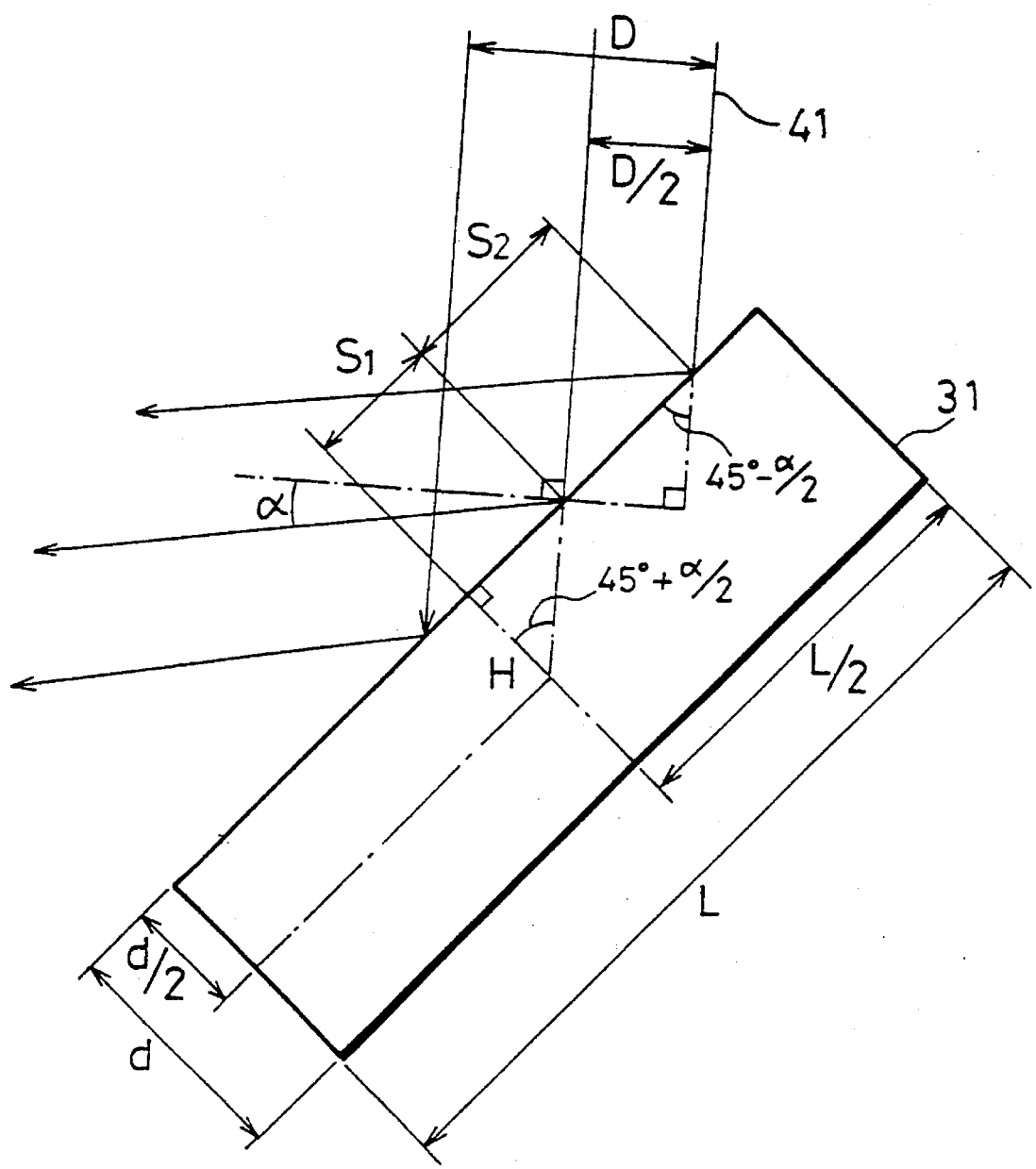
FIG. 6 is a depiction explaining a mirror spacing required when a double-sided mirror is used as the movable mirror in the laser beam printer.

When a double-sided mirror is used as the movable mirror 14, the space between mirrors is desired to be small to ensure the scanning angle of $\pm\alpha°$ for writing and reading and to minimize the deviation of the scanning center H. As illustrated in FIG. 6, when the laser light 41 is scanned through angles of $\pm\alpha°$ from a line orthogonal to the incident direction of the laser light 41 on the double-sided mirror 31, the scanning center of the laser light 41 is controlled to come to the center H of the double-sided mirror 31, and when the double-sided mirror 31 is in a position to reflect the laser light 41 to a direction of $(90+\alpha°)$ with respect to the incident direction of the laser light 41, an area located at the extreme end of the mirror surface is used.

At this time, it is desirable that the entire effective region of the laser light 41 is within the mirror surface, and the following condition needs to be satisfied.

$$L/2 > S_1 + S_2$$

where D is an effective diameter of the laser light 41, L is the length of the double-sided mirror 31, d is the space between the mirror surfaces, $S_1$ is the distance from a position on a mirror surface corresponding to the mirror center H and a position on the mirror surface on which the center of the laser light 41 falls, and $S_2$ is the distance between a position on the mirror surface on which the center of the laser light 41 falls and an edge of the effective diameter of the laser light 41. Namely, since $S_1/(d/2)=\tan(45°+\alpha°/2)$, $S_1$ is given as follows.

$$S_1 = d \cdot \tan(45°\alpha°/2)/2$$

And, since $(D/2)/S_2 = \sin(45° - \alpha°/2)$, $S_2$ is given as follows.

$$S_2 = D/2 \sin(45° - \alpha°/2)$$

Therefore, in order to effectively use the mirror surfaces, it is necessary to meet the following conditions.

$$L/2 > d \cdot \tan(45° + \alpha°/2)/2 + D/2 \sin(45° - \alpha°/2)$$

It is desirable to have the space d between the mirror surfaces within the following range $$d > [L \cdot \sin(45° - \alpha°/2) - D]/\sin(45° - \alpha°/2) \cdot \tan(45° + \alpha°/2)$$

By setting the space d of the mirror surfaces as described above, the laser light strikes within the mirror surface and the edge portions of the reflecting surfaces are effectively used.

[Embodiment 2]

Figure 7:
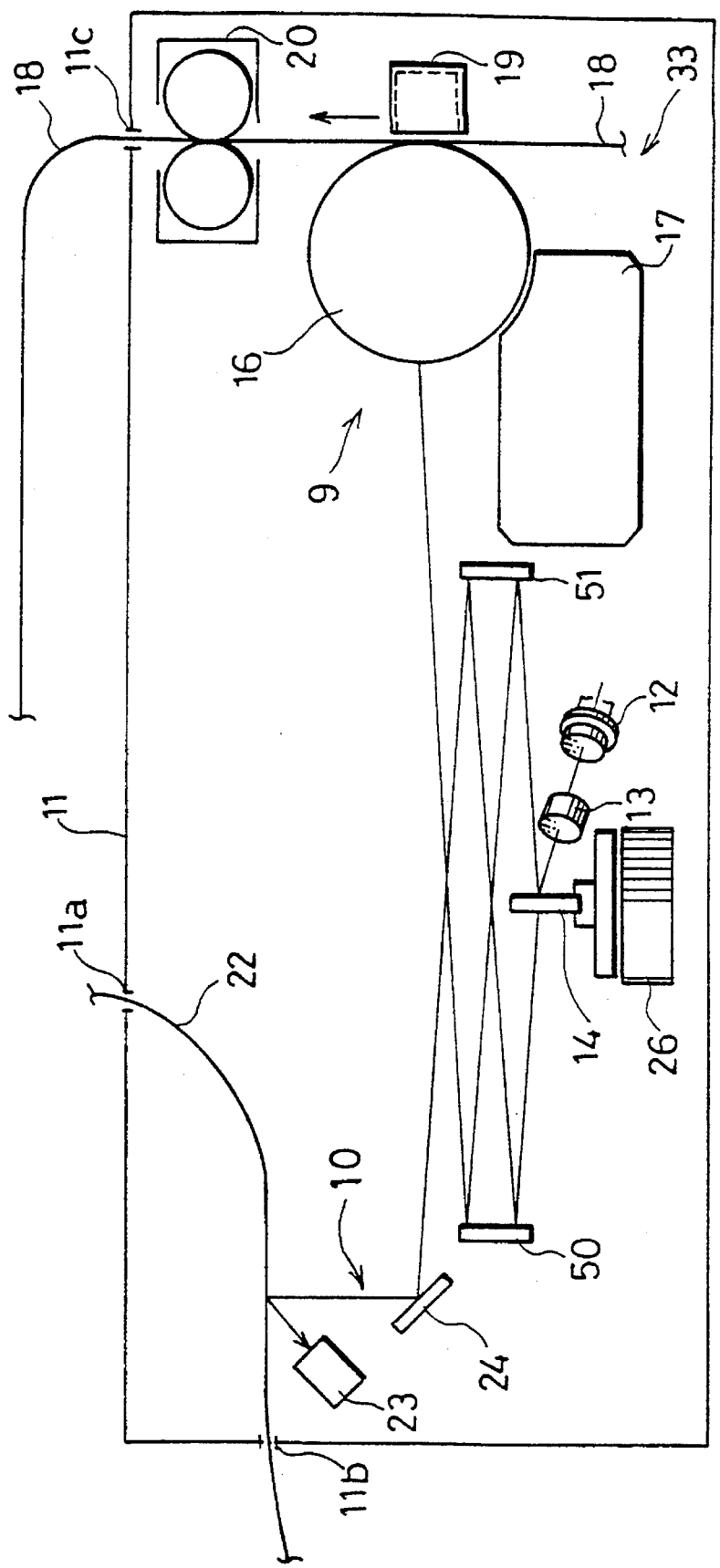
FIG. 7 is a depiction showing a schematic structure of a laser beam printer according to another embodiment of the present invention.
Figure 8:
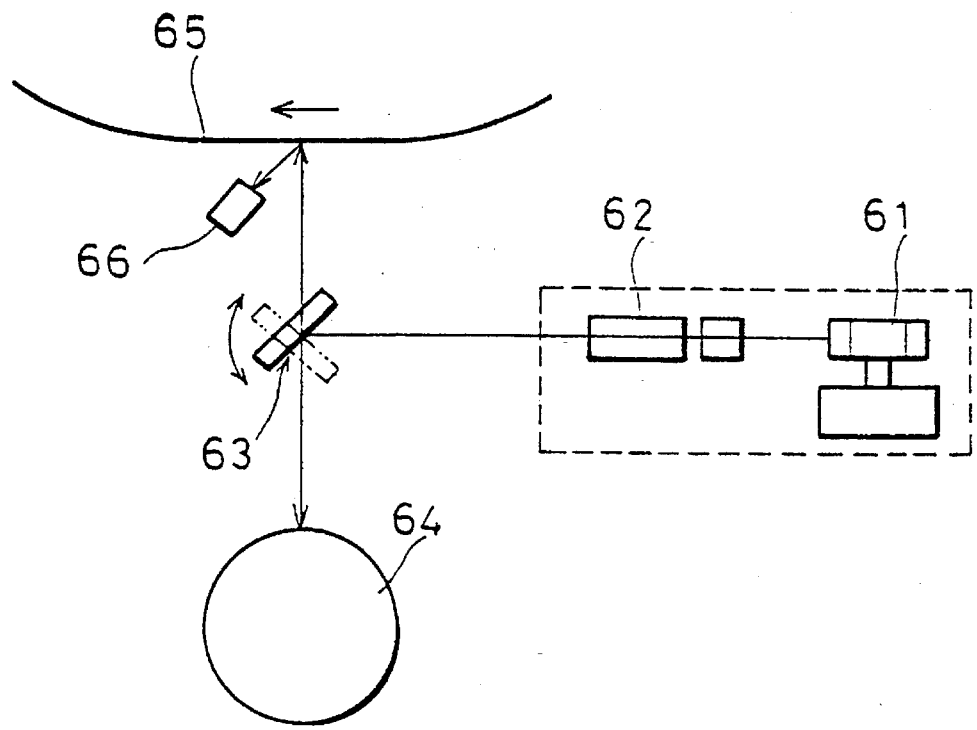
FIG. 8 is a depiction showing a schematic structure of a conventional laser beam printer.
Figure 9:
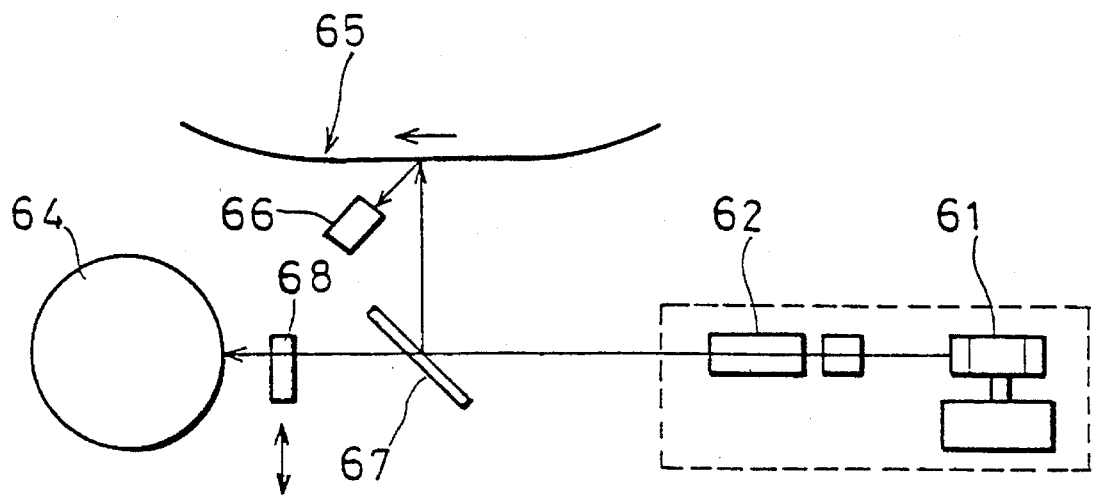
FIG. 9 is a depiction showing a schematic structure of another conventional laser beam printer.

Referring now to FIG. 7, the following description discusses another embodiment of the present invention. The members having the same function as in the above-mentioned embodiment will be designated by the same code and their description will be omitted.

A laser beam printer of this embodiment has a document reading function, and incorporates first and second reflecting mirrors (reflecting means) 50 and 51 as shown in FIG. 7 instead of the correction lenses 15 and 21 of the above-mentioned embodiment. Except for this difference, the structure of the laser beam printer is the same as that of the first embodiment.

The first and second reflecting mirrors 50 and 51 are disposed symmetrically about the movable mirror 14. Laser light emitted by the semiconductor laser 12 passes through the converging lens 13 and falls upon the movable mirror 14 which is rotated by the scan mirror motor 26. The laser light which has been deflected by the movable mirror 14 first falls upon, for example, the second reflecting mirror 51 depending on the rotation angle of the movable mirror 14. In this case, the reflected light from the second reflecting mirror 51 falls upon the first reflecting mirror 50. Then, the reflected light from the first reflecting mirror 50 strikes the surface of the photoreceptor 16.

As described above, when the laser light from the movable mirror 14 first falls upon the second reflecting mirror 51, the laser light is modulated at the predetermined time based on the writing data like in the first embodiment. A latent image is then formed on the surface of the photoreceptor 16 by the modulated laser light. Thereafter, printing is performed in the manner described in the first embodiment.

When the movable mirror 14 is further rotated at a constant speed by the scan mirror motor 26, the deflecting direction of the laser light changes. Therefore, the laser light deflected by the movable mirror 14 first falls upon the first reflecting mirror 50. Then, the laser light reflected by the first reflecting mirror 50 strikes the second reflecting mirror 51. The laser light reflected by the second reflecting mirror 51 reaches the surface of the document 22 through the mirror 24. The laser light reflected by the surface of the document 22 falls upon the reading element 23 having a single light receiving surface. The reading element 23 reads out the document data from the intensity of the reflected light corresponding to the surface state of the document 22. When reading the document data, the semiconductor laser 12 emits continuous light under the control described in the first embodiment.

This series of operations is performed during a rotation of the movable mirror 14, and writing and reading are simultaneously carried out by repeating the series of operations.

Denoting that points at which a perpendicular line from the movable mirror 14 crosses the surface of the photoreceptor 16 and a perpendicular line from the movable mirror 14 crosses the surface of the document 22 as optical axis points, since the movable mirror 14 is rotated at a constant angular speed, a speed at which a spot of the laser light formed on the surfaces is moved, i.e., a scanning speed of the laser light is not uniform. Namely, the scanning speed becomes faster as the spot is moved away from the optical axis point, resulting in a distorted image.

In this embodiment, however, since the laser light is reflected by the first and second reflecting mirrors 50 and 51, the distances of the optical paths extending to the surface of the photoreceptor 16 and the surface of the document 22 become longer. It is thus possible to control the difference in the scanning speed between the optical axis point and points other than the optical axis point to be within a tolerance. With this structure, it is not necessary to provide optical path correcting means such as the relatively expensive correction lenses 15 and 21 used in the first embodiment, thereby reducing the cost of the laser beam printer.

When controlling the deflecting direction of the laser light by reflecting the laser light with the two pieces of the reflecting mirror 50 and 51, it is desirable to locate the writing area and the readout area symmetrically about the movable mirror 14. It is also desirable to arrange the incident angles of the laser light on the writing area and the readout area to be right angles, respectively.

Additionally, like in the first embodiment, either a single-sided or a double-sided mirror may be used as the movable mirror 14. When the double-sided mirror is used, it is desirable to set the space between the mirror surfaces in the manner described in the first embodiment.

Moreover, although the laser light is reflected once by the reflecting mirrors 50 and 51, respectively, it is also possible to reflect the laser light by the reflecting mirrors 50 and 51 several times, respectively. It is not necessary to make the number of times reflecting the laser light for reading and the number of times reflecting the laser light for writing equal to each other. Thus, even if the number of times reflecting the laser light is varied between reading and writing, the present invention is still applicable, and produces the same effects.

[Embodiment 3]

The following description discusses still another embodiment of the present invention.

A laser beam printer of this embodiment includes a clock correcting circuit for correcting the scanning speed of laser light to a constant speed when reading and writing information by varying a timing clock which determines the speed of reading and writing information, instead of the correction lenses 15 and 21 used in the laser beam printer of the first embodiment. Except for this difference, the structure of the laser beam printer of this embodiment is the same as that of the laser beam printer of the first embodiment, and therefore a detail explanation is omitted.

Denoting that points at which a perpendicular line from the movable mirror 14 crosses the surface of the photoreceptor 16 and a perpendicular line from the movable mirror 14 crosses the surface of the document 22 as optical axis points, since the movable mirror 14 is rotated at a constant angular speed, a speed at which a spot of the laser light formed on the surfaces is moved, i.e., a scanning speed of the laser light is not uniform. Namely, the scanning speed becomes faster as the spot is moved away from the optical axis point, resulting in a distorted image.

The clock correcting circuit corrects the inconstant scanning speeds of the laser light on the surfaces of the photoreceptor 16 and the document 22 by varying the timing clock when writing and reading information based on the ratio of a scanning speed at a location presently scanned by the laser light to the scanning speed at the optical axis point. As a result, information is written and read without distortion.

If the clock correcting circuit is composed of, for example, a variable frequency dividing circuit for dividing a frequency of an oscillator by a predetermined dividing ratio, a modulation circuit for modulating an output of the oscillator and an output of the variable frequency dividing circuit, and a band pass filter for extracting only a predetermined frequency component from an output of the modulation circuit, it is possible to obtain a clock frequency for determining a speed corresponding to the position scanned by the laser light from the band pass filter.

With this structure, there is no need to use a costly correction lens for fθ correction, and reflecting mirrors 50 and 51 used in the second embodiment, thereby reducing the space. Namely, it is possible to minimize the manufacturing cost, and achieve a more compact optical scanning apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical scanning apparatus comprising:

a laser light source for emitting laser light;

information reading means for reading information from a document using the laser light;

information writing means for recording the information using the laser light;

light deflecting means for deflecting the laser light from the laser light source by rotation so as to guide the laser light to said information reading means and said information writing means alternately; and controlling means for controlling said laser light source depending on a rotation angle of said light deflecting means so that said laser light source emits continuous light when the laser light reaches said information reading means through said light deflecting means and that said laser light source emits modulated light corresponding to the information when the laser light reaches said information writing means through said light deflecting means.

2. The optical scanning apparatus according to claim 1, further comprising fθ correcting means for correcting a scanning speed of the laser light so that the laser light performs scanning at a uniform speed in said information reading means and said information writing means.

3. The optical scanning apparatus according to claim 2, wherein said fθ correcting means are optical members for performing an fθ correction, and disposed on an optical path between said light deflecting means and said information reading means and on an optical path between said light deflecting means and said information writing means.

4. The optical scanning apparatus according to claim 3, wherein said optical members are lenses.

5. The optical scanning apparatus according to claim 3, wherein said optical members are mirrors.

6. The optical scanning apparatus according to claim 3, wherein said optical members are processed to attenuate a light amount.

7. The optical scanning apparatus according to claim 1, further comprising reflecting means, disposed symmetrically about said light deflecting means, for lengthening optical path distances from said light deflecting means to said information reading means and to said information writing means by further reflecting the laser light reflected from said light deflecting means.

8. The optical scanning apparatus according to claim 7, wherein said reflecting means includes a plurality of optical members which are disposed so that the laser light reaches said information reading means and said information writing means after being reflected a plurality of times by said reflecting means.

9. The optical scanning apparatus according to claim 1, further comprising attenuating means for attenuating a light amount on an optical path between said light deflecting means and said information reading means and on an optical path between said light deflecting means and said information writing means.

10. The optical scanning apparatus according to claim 1, further comprising clock correcting circuit for varying a timing clock for determining a speed of writing and reading information.

11. The optical scanning apparatus according to claim 1, wherein said light deflecting means includes one reflecting surface or two reflecting surfaces.

12. The optical scanning apparatus according to claim 1, wherein said information reading means and said information writing means are disposed symmetrically about said light deflecting means, and said laser light source is disposed so that a straight line connecting said information reading means and said information writing means crosses substantially at a right angle a straight line connecting said light deflecting means and said laser light source.

13. The optical scanning apparatus according to claim 12, wherein said light deflecting means is a flat mirror having a reflecting surface on both sides and a mirror thickness d satisfying $$d < [L \cdot \sin(45° - \alpha°/2) - D]/\sin(45° - \alpha°/2) \cdot \tan(45° + \alpha°/2)$$

where D is a beam diameter of incident laser light, L is a length of said flat mirror, and a scanning angle of the laser light is $\pm\alpha°$.

14. The optical scanning apparatus according to claim 1, further comprising detecting means for detecting a first point at which writing information starts, a second point at which writing information ends, a third point at which reading information starts, and a fourth point at which reading information ends.

15. The optical scanning apparatus according to claim 14, wherein said laser light source includes light source driving means for driving said laser light source upon an instruction from said controlling means so that said laser light source emits laser light which is modulated according to information to be written during a time between said first and second points, and that said laser light source emits continuous light during a time between said third and fourth points.

16. The optical scanning apparatus according to claim 1, wherein said information reading means includes a light receiving element having a single light receiving surface.

* * * * *